United States Patent

Butts

[15] 3,690,175
[45] Sept. 12, 1972

[54] MECHANISM FOR PREDICTING FOOD TEMPERATURES

[72] Inventor: Earl E. Butts, Niles, Mich.
[73] Assignee: Clark Equipment Company
[22] Filed: April 5, 1971
[21] Appl. No.: 131,008

[52] U.S. Cl. .................. 73/343 R, 73/1 F, 73/352, 73/359, 73/432 SD
[51] Int. Cl. ..................... G01k 1/16, G01k 7/04
[58] Field of Search ...73/1 F, 15 R, 343 R, 352, 359, 73/432 SD

[56] References Cited

UNITED STATES PATENTS

| | | | |
|---|---|---|---|
| 2,752,411 | 6/1956 | Walter | 73/359 X |
| 2,769,334 | 11/1956 | Soehngen | 73/15 R |
| 2,979,841 | 4/1961 | Bellis | 40/126 |
| 2,998,720 | 9/1961 | Williams et al. | 73/432 SD X |
| 3,299,275 | 1/1967 | Green et al. | 73/339 R X |
| 3,606,792 | 9/1971 | Yoshimoto | 73/352 X |

*Primary Examiner*—Louis R. Prince
*Assistant Examiner*—Frederick Shoon
*Attorney*—Kenneth C. Witt, John C. Wiessler, Robert H. Johnson, Lewis J. Lamm and Robert J. Norton

[57] ABSTRACT

Apparatus for predicting the surface temperature of packaged foodstuff, particularly meat, when the packages are exposed to a refrigerated environment. In the preferred form, it utilizes a model of red beefsteak manufactured from two metallic plates with insulating material sandwiched therebetween. In this embodiment, the exterior surface of the panel is textured and coated the same color as the meat being simulated and the temperature of the surface of the plate mating with the insulating material is measured by utilizing a thermocouple connected to an electric meter.

10 Claims, 6 Drawing Figures

INVENTOR
EARL E. BUTTS
BY Lewis J. Lamm
ATTORNEY

INVENTOR
EARL E. BUTTS
BY Lewis J. Lamm
ATTORNEY

MECHANISM FOR PREDICTING FOOD TEMPERATURES

BACKGROUND AND SUMMARY OF THE INVENTION

This invention relates to the method of and apparatus for predicting the surface temperature of foodstuff stored in a refrigerated environment where it may be subject to convection, conduction and radiation heat transfer factors. It is quite difficult to measure or predict the surface temperature of foodstuff when it is subjected to various combinations of these factors. It is particularly difficult to provide a standard means and method of predicting the surface temperature of meat when it is stored in a refrigerated environment where it is subjected to air convection currents, the radiation affect of lights used for illumination and the heat conduction affects of the surrounding foodstuff. It is also noted that red meat does not have a standard texture and color, but instead has texture and color which varies around a norm and changes with time and environment. Wrapped meat with occluded air is subjected to a "hot-house" effect which is a function of illumination, intensity and light wave length, wrapper characteristics, and the quantity of occluded air.

In order to evaluate the efficiency of a refrigerated display case, it is necessary to standardize as many of the variable factors as possible. Since the heat retention and transfer characteristics of the foodstuff being preserved presents the greatest number of variable factors, it is desirable to have a standardized model of the foodstuff to be stored in the cabinet. The model must be designed with predictable heat retention and heat transfer characteristics which approximate those of the foodstuff to be simulated.

In the preferred form of the present invention, the model represents a T-bone beefsteak and is produced by sandwiching a panel of expanded styrene between two aluminum plates, each plate having an exterior texture and color approximating that of red meat and having a thermocouple attached to the undersurface of one of the metal panels. This model has the same shape and thickness as the T-bone beefsteak it represents. It may be wrapped the same way as the meat it simulates and thus be subject to the same hot-house effects.

The prior art shows many examples of simulating meat and other foodstuff in appearance for advertising display purposes, and also discloses the use of thermocouples for measuring surface temperatures of metal.

In the present invention, a foodstuff model having standard heat characteristics is used as a standard to measure the operating characteristics of a refrigerated display case.

It is, therefore, an object of the present invention to provide and use a standardized foodstuff model to predict the surface temperature of foodstuff when exposed to a predetermined environment.

It is another object of the present invention to provide a standardized foodstuff model for use in evaluating temperature environmental control apparatus.

It is a further object of the present invention to provide a foodstuff model with response to convection, radiation, and conduction heat transfer that approximates the median or average response of the foodstuff which it simulates.

It is a further object of the present invention to provide a means for predicting the surface temperature of foodstuff in a predetermined environment.

It is a further object of the present invention to provide a standardized method and means for rating the operating characteristics of a refrigeration cabinet.

Further objects of the present invention will become apparent from inspection of the drawings and specification and will be pointed out in the claims.

BRIEF DESCRIPTION OF THE PREFERRED EMBODIMENT

Referring to the figures in the drawing.

Figure 1:
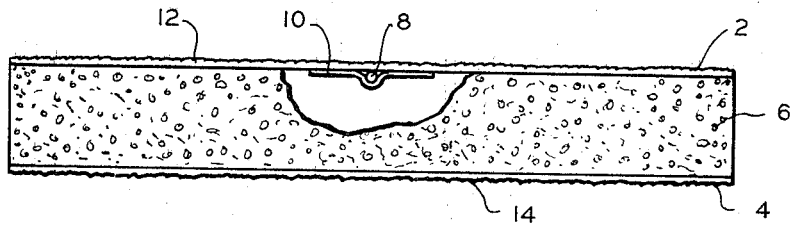
FIG. 1 is a cross section view of the preferred embodiment of the foodstuff model.
Figure 2:
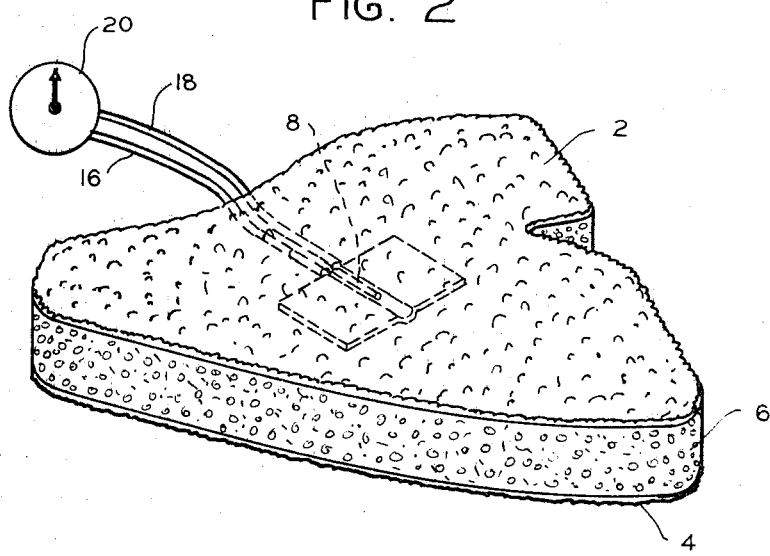
FIG. 2 is a view of one particular embodiment of the present invention in which the standard model simulates a T-bone beefsteak.
Figure 4:
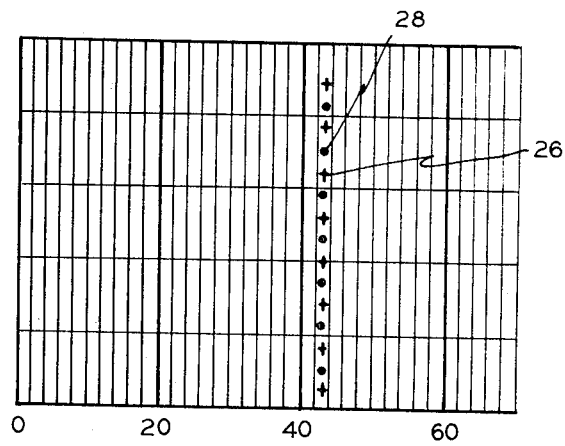
FIG. 4 is a time-temperature chart comparing the actual temperature at the surface of a piece of meat with that taken by the model shown in FIGS. 1 through 3 under identical environmental conditions.

Referring now more particularly to FIGS. 1 and 2, 2 and 4 are aluminum panels 0.05. inches thick, separated by a panel of insulating material 6, here shown as a 1 inch thick panel of expanded styrene. A thermocouple 8 is mounted on the underneath side of panel 2 and held in place by aluminum self-adhesive tape 10. The panels 2 and 4 are both glued to the panel 6 to provide a unit approximating the thickness and configuration of the foodstuff package it simulates. In the present illustration, this foodstuff package is a T-bone steak of beef approximately 1 inch thick. In the particular embodiment shown, the outer surfaces of the panels 2 and 4 are textured and painted the color of the red meat it represents. This coating of paint is approximately 0.0015 inches.

The thermocouple 8 has attached thereto insulated wires 16 and 18 which are connected to a meter 20 calibrated to read in degrees of temperature. The thermocouple 8, the lead-in wires 16 and 18 and the meter 20 are all of standard construction readily available in the art and therefore are shown here only in schematic form.

Figure 3:
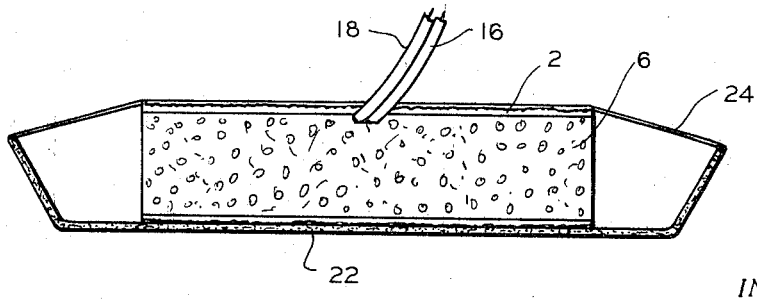
FIG. 3 is a view of the foodstuff model wrapped in a manner similar to that used for wrapping the foodstuff it represents.

Referring now to FIG. 3, the foodstuff model shown as beef steak in FIGS. 1 and 2 is here shown wrapped as it would be for display and storage in a refrigerated display case. The tray 22 is a molded expanded styrene case such as is normally used for retailed wrapping of meat. The wrapping 24 is a polyvinyl chloride 75 gauge film.

Referring to FIG. 4, a time vs. temperature chart is shown illustrating the close correlation between temperatures taken on the surface of red meat and that taken utilizing the simulating technique of the present invention. The readings are within 1°F. and, therefore, may be considered within the normal experimental error.

Figure 6:
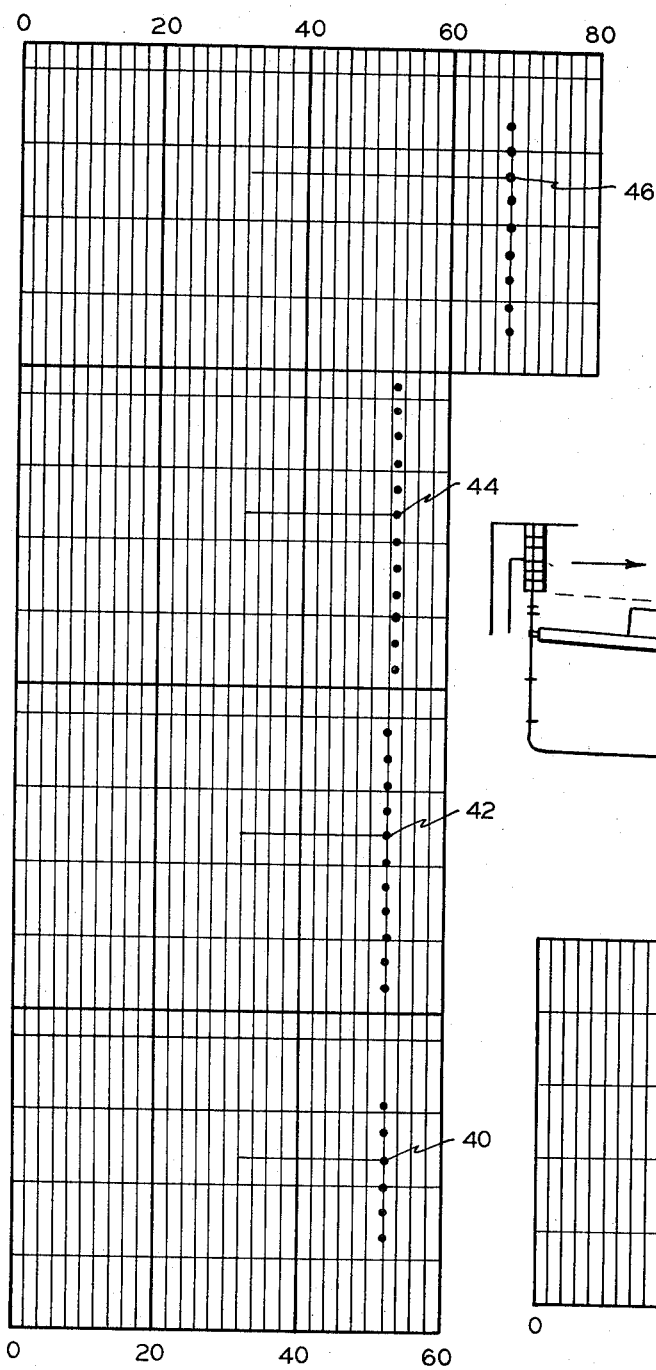
FIG. 6 is a time-temperature chart obtained on models arranged as shown in FIG. 5.
Figure 5:
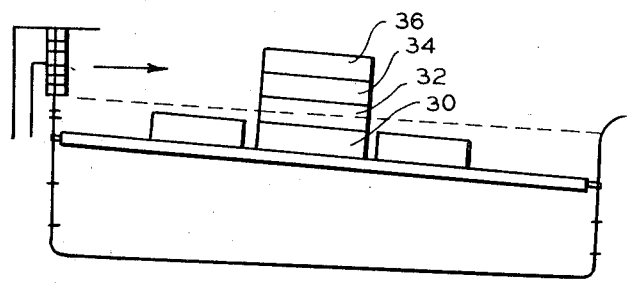
FIG. 5 shows a typical arrangement of meat packages in a freezer.

Referring to FIG. 5, a typical loading of a refrigerator display case is shown. Simulated meat packages such as shown in FIG. 3, were stacked in a refrigerated display case, one on top of the other. The readings taken on the packages 30, 32, 34 and 36 are shown in FIG. 6 as 40, 42, 44 and 46, respectively.

In this particular instance, the display case temperature is maintained at 52°F., while the ambient temperature outside the display case is 80°F. dry bulb, with 60 percent relative humidity. It will be noted by inspection of the time-temperature chart shown in FIG. 6 that the simulated articles 30 were maintained at 52°F. as shown at 40. The article 32 was maintained at 52°F. as shown by 42. The article 34 was recorded at 53°F. by the chart 44 and thus was still within the safe range for storage of the meat. 36, which is shown by the chart 46 as being at 68°F. is well outside of the safe temperature range.

While it is a good rule of thumb that foodstuff should be stored at least 2 inches below a line drawn between the refrigerated air inlet and outlet of a display case, there are other factors which vary from store to store which affects the actual surface temperature of meat stored in a display case. For example, if the ceiling temperature of a store increases from 60° to 110°, the meat stored in an open refrigerated display case may increase a total of 4°F. Other variations such as drafts will make this variation even greater. A second environmental affect located outside the display case is the radiant heat resulting from variation in size and type of illuminating lamps. For example, the use of a 75 watt standard incandescent floodlight on three foot centers, 7 feet above the floor, might result in a meat temperature rise of 4°F. over that experienced when fluorescent or mercury vapor lamps are used. If 150 watt lamps are used under the same set of circumstances, the temperature rise may be as much as 9°F. over that when fluorescent or mercury vapor lamps giving the same foot candle of lighting intensity is used. Also, the improper packing of the meat in the display case or its improper distribution due to meat being removed by customers may result in a 2°F. or more rise in meat surface temperature over that anticipated.

Another source of temperature variation from that anticipated is the "hot-house" effect appearing in wrapped meat. This hot-house effect is due to the radiant energy reflected by the meat being trapped by the wrapper surrounding the package. The wave length of the energy transmitted from an outside source through the wrapper to the meat and its angle of incident to the wrapper varies considerably from that reflected from the meat. This results in energy being transferred through the wrapper to the meat and then the reflected energy being trapped in a manner similar to the trapping of heat in a green house or hot house used for raising plants. This hot-house effect, when a package is loosely wrapped, can result in a 2° to 4°F. increase in temperature in the meat surface.

As a result of the above-mentioned variations of environment to which a standardized display case and its contents are exposed, it is difficult to predict with exactness the surface temperature of the meat based only on the environmental factors generated within the case. It is, therefore, necessary to have a method of measuring the resultant of all the individual environmental affects to predict foodstuff temperatures in a display case and thus determine the temperature of the refrigerated air necessary to assure the surface temperature of the foodstuff being maintained such as to prevent spoilage.

OPERATION OF PREFERRED EMBODIMENT

There are several uses for the invention disclosed in the present application and two major uses are:

1. for the comparison of two dissimilar refrigerator cases when operated in a standard ambient environment;
2. for determining the mode of operation of a standardized refrigerated display case in a supermarket or other similar area under various unknown ambient environmental conditions.

In the first case, the present invention is very useful in designing the refrigerated case and in the second case, it is very useful in adjusting the refrigerated air temperatures and rates of flow to insure proper refrigeration of the foodstuff being displayed in a supermarket or other sales area.

In using the present invention, a refrigerated case is packed, as it would normally be for display of merchandise, with simulated packages and temperature readings taken at various areas throughout the case. After the readings are taken, adjustments are made to air flow and temperature to obtain the necessary surface temperature of the simulated food packages and thus be able to assure the surface temperature of the food will be proper when it is stored under the ambient conditions affecting the ease and its contents.

Having thus described the preferred embodiment of the present invention, it will, of course, be understood that various changes may be made in the particular equipment to simulate different food parcels and that various types of temperature measuring devices may be used without departing from the scope of the invention which consists of the matter shown and described herein and set forth in the appended claims.

I claim:

1. A mechanism for predicting the temperature of food in a refrigerated environment comprises:
    a first metal panel,
    a second metal panel spaced normally from said first panel,
    thermally insulating material secured between said panels and supporting said panels in fixed relationship with each other, so the thermal characteristics of the mechanism are substantially the same as said food,
    a thermo responsive device located in close proximity to one of said metal panels capable of sensing the temperature of the surface of said panel closest to said thermally insulating material,
    and temperature measuring device associated with said thermo responsive device capable of indicating the temperature of said panel, whereby the temperature of foodstuff may be predicted when said foodstuff is placed in the position corresponding to the position of said two metal panels.

2. A mechanism for predicting the temperature of food in a refrigerated environment as claimed in claim 1 in which:
    the metal panel closest to said thermo responsive device is aluminum.

3. A mechanism for predicting the temperature of food in a refrigerated environment as claimed in claim 1 in which:
the thermally insulating material secured between said panels is a porous material having low heat conductivity.

4. A mechanism for predicting the temperature of food in a refrigerated environment as claimed in claim 1 in which:
the metal panel closest to said thermo responsive device has a surface opposite said thermally insulating material of texture and color approximating that of the foodstuff it is designed to simulate.

5. A mechanism for predicting the temperature of food in a refrigerated environment as claimed in claim 1 in which:
the metal panels are spaced apart by a distance approximating the thickness of the foodstuff being simulated.

6. A mechanism for predicting the temperature of food in a refrigerated environment as claimed in claim 1 in which:
the metal panels are sheet aluminum and the thermally insulating material is expanded styrene.

7. A mechanism for predicting the temperature of food in a refrigerated environment as claimed in claim 1 in which:
the two metal panels, the thermally insulating material and the thermo responsive device are all encased in a wrapping of the same material and thickness as that which is used on the foods being simulated.

8. A mechanism for predicting the temperature of food in a refrigerated environment as claimed in claim 1 in which:
said second metal panel is spaced normally from said first panel by the distance of a slice of meat being simulated,
and the exterior surfaces of said metal panels have the same texture and color as the meat being simulated.

9. A mechanism for predicting the temperature of food in a refrigerated environment as claimed in claim 1 in which:
the thermo responsive device is a thermocouple secured to the surface of one of said metal panels next to said thermally insulating material and
the temperature measuring device is a volt meter capable of measuring the electrical signal generated by said thermocouple throughout the temperature range of said refrigerated environment.

10. A mechanism for predicting the temperature of food in a refrigerated environment as claimed in claim 1 in which:
said metal panels and said thermally insulating material is shaped in a contour and dimension approximating that of a steak and the external surface of said panels has the texture and color of freshly cut beef.

* * * * *